Oct. 7, 1958     B. STRONG     2,854,691
PLASTIC EXTRUSION MACHINE
Filed April 9, 1956     5 Sheets-Sheet 1

Inventor
Bernard Strong
By
Attorney

Oct. 7, 1958  B. STRONG  2,854,691
PLASTIC EXTRUSION MACHINE
Filed April 9, 1956  5 Sheets-Sheet 2

Inventor
*Bernard Strong*
By
*Holcomb, Wetherill & Brisebois*
Attorney

Oct. 7, 1958
B. STRONG
2,854,691
PLASTIC EXTRUSION MACHINE
Filed April 9, 1956
5 Sheets-Sheet 3
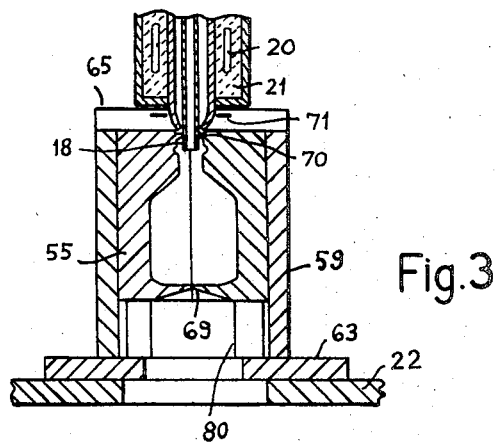
Fig.3
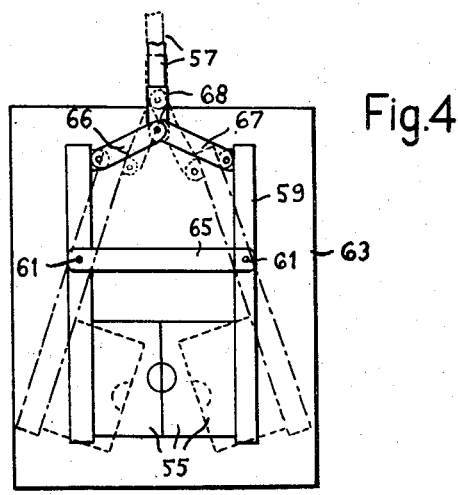
Fig.4
Fig.5
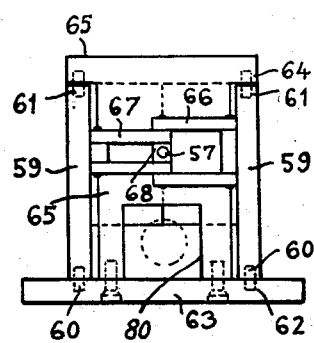
Inventor
*Bernard Strong*
By
*Holcomb, Vethville Brinks*
Attorney

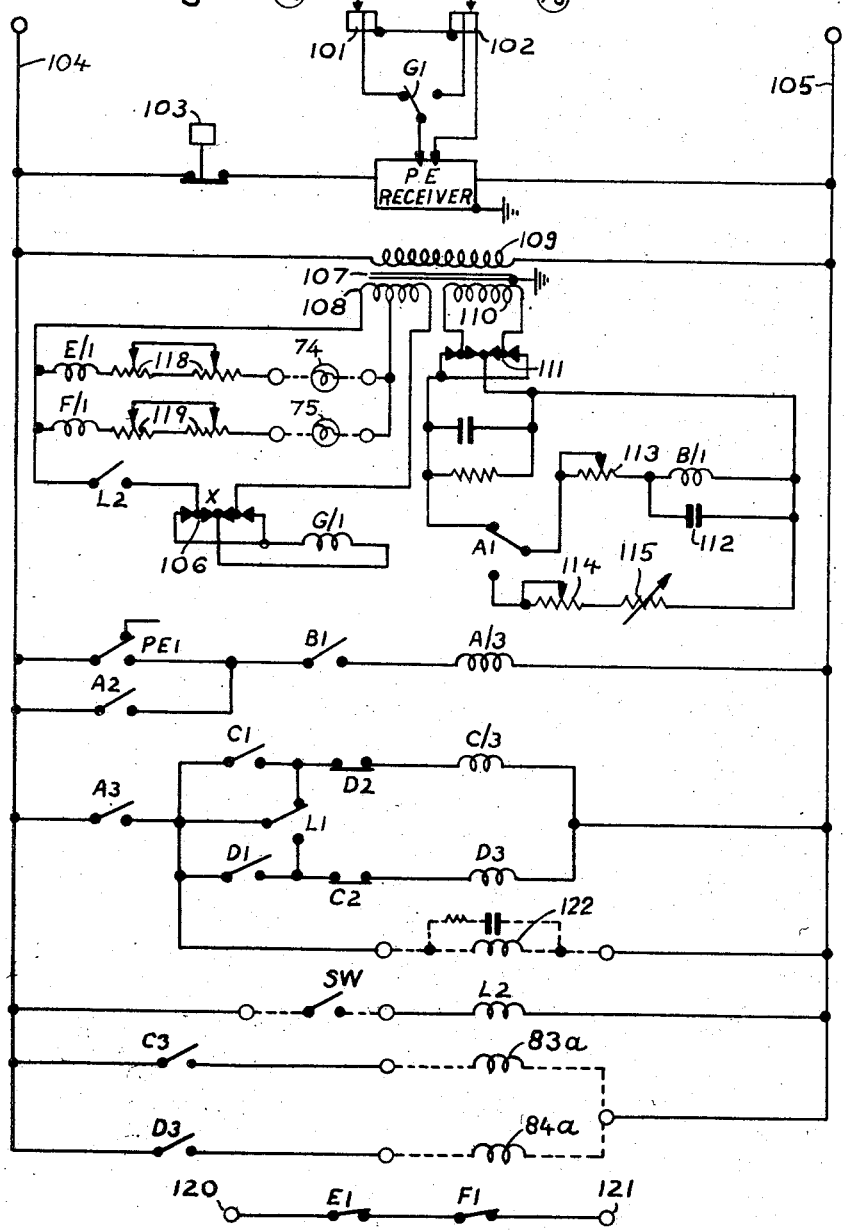

United States Patent Office 2,854,691
Patented Oct. 7, 1958

2,854,691

PLASTIC EXTRUSION MACHINE

Bernard Strong, Ferndown, Northwood Hills, England, assignor to E. Shipton & Company Limited, Ferndown, Northwood Hills, England, a British company Application April 9, 1956, Serial No. 577,109

Claims priority, application Great Britain April 12, 1955

11 Claims. (Cl. 18—5)

This invention relates to machines for extruding organic plastic materials, commonly known as "plastics," and more particularly to machines for the manufacture of bottles and other hollow articles from organic plastic materials, in which the material in plastic form is extruded through an annular extrusion nozzle until a tube of the plastic material of predetermined length is formed, when the extrusion is stopped, the extruded tube being blown up to conform with the contour of a surrounding mould cavity to form the hollow article.

The blowing of the extruded length of tube may be effected whilst the tube is still positioned below the extrusion nozzle, for example by admitting compressed air or other fluid through a passage in the core of the annular nozzle or by inserting a separate pipe into the tube, or it may be effected after the extruded length of tube has been severed from the nozzle and has been moved to a separate blowing position where an inlet pipe for the compressed fluid is inserted into the bore of the tube.

Hitherto, with automatically controlled machines, the starting and stopping of the extrusion (for example actuation of a tap or valve controlling the supply of plastic material to the nozzle or the starting and stopping of the extrusion screw) for producing the predetermined lengths of tubing from which successive articles are blown has been controlled by a timing mechanism or by a mechanism controlled by the machine cycle, such as by a predetermined number of revolutions of the extrusion screw. By reason of the fact that the rate of extrusion depends, inter alia upon the plasticity of the material being extruded, the length of the tube extruded for any pre-set time or machine cycle will change with variations in plasticity which arise through non-uniform heating of the material which may occur for various reasons. Consequently the machine is always adjusted to extrude a greater length of tubing than is necessary to make a predetermined hollow article, in order to ensure that, under no circumstances, will the length of tube extruded be too short. This not only entails an undesirable slowing down of the machine time cycle, but also extra regrinding of "waste" material for reuse.

According to this invention the length of tube extruded is automatically controlled by measuring means which responds to stop extrusion when the desired length of tube has been extruded. Preferably the measuring means comprises a photo-electric cell so arranged that when a desired length of plastic tube has been extruded from the nozzle, the tube itself will pass into the path of a light beam associated with the cell to cause the latter to operate apparatus to stop further extrusion from said nozzle. The operation of the measuring means may also initiate further automatic control operations such as mould closing, and commencement of blowing in the machine cycle, so that these further control operations will occur as soon as possible after extrusion is stopped.

By means of the invention the length of tube extruded can be accurately controlled, independently of variations in plasticity of the plastic material and other factors.

The invention may be applied to machines having a single nozzle head (which head may carry one or more nozzles) through which the plastic material is repeatedly extruded, or to multiple nozzle head machines in which the plastic material is selectively extruded through the different nozzle heads in turn. In this latter case separate photo-electric cells may be associated with each nozzle head, each respectively stopping extrusion from its associated nozzle head when the desired length of plastic tube has been extruded from the or all the nozzles of that head, and changing over the distributor means for extrusion from another nozzle head.

The instant at which extrusion recommences after having been stopped by the photo-cell or equivalent measuring means may be controlled by means operating in response to the remainder of the machine cycle. Preferably, however, according to a feature of the invention, the instant when extrusion recommences is controlled through an adjustable time delay circuit or device triggered by the operation of the photo-cell or measuring means, whereby the time interval during which extrusion is stopped may be adjusted independently of the means controlling the other operations of the machine cycle.

In order that the invention may be more clearly understood, reference will now be made to the accompanying drawings, in which:

Figure 3 is a section through a single nozzle head, with a mould in position, looking from the front of the machine.

Figure 4 is a plan view of the mould shown in Figure 3.

Figure 5 is a rear view of the mould of Figures 3 and 4.

Figure 7 is a circuit diagram of one form of timing device.

Figure 1:
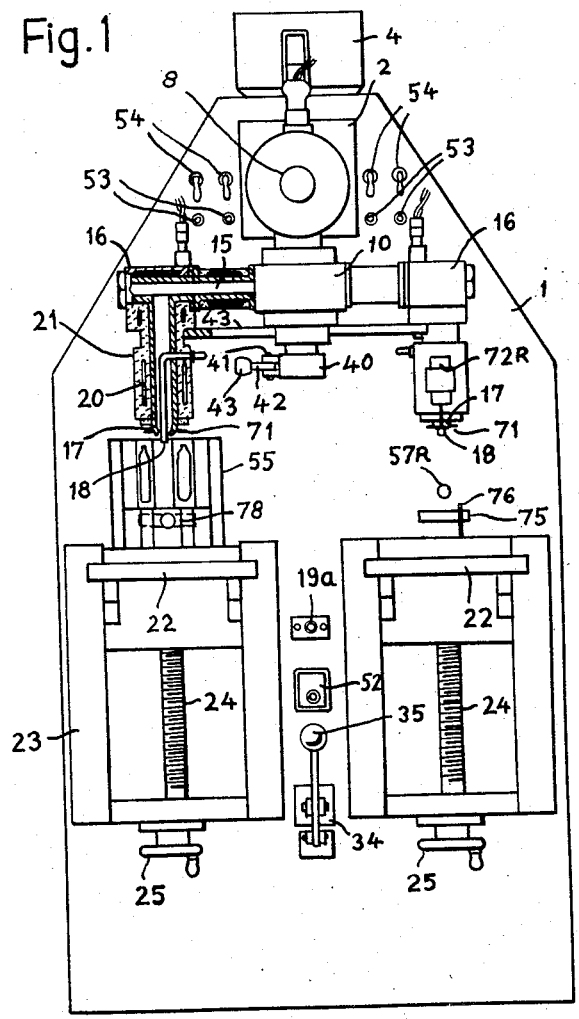
Figure 1 is a front view of a machine according to this invention, the left nozzle head and its feed conduit being shown in section, and a mould being shown in its open position beneath the left nozzle head, the associated light source being omitted.
Figure 2:
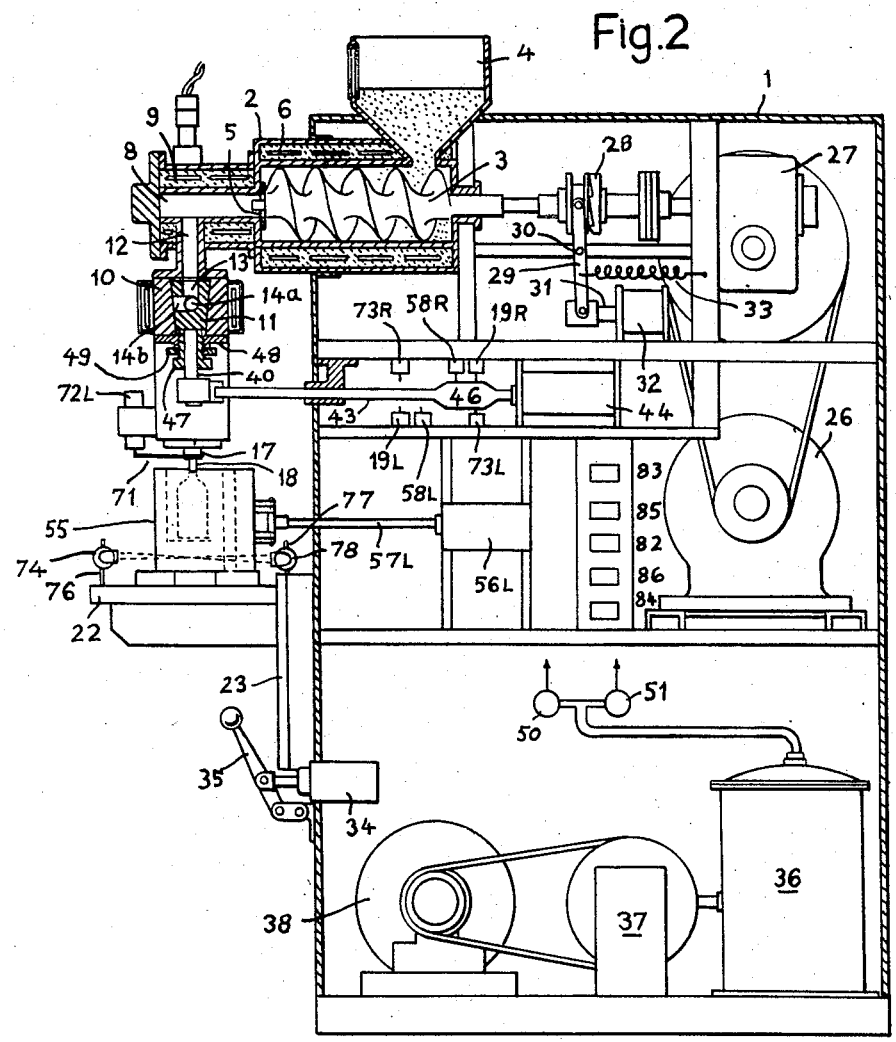
Figure 2 is a section through the machine along the line A—A in Figure 1.

The machine illustrated in Figures 1 and 2 of the drawings comprises a machine housing 1 through the top of the front of which extends the end of a heated chamber 2, in which is arranged a rotatable feed screw 3. Comminuted plastic material is fed to the chamber 2 by the hopper 4, the plastic being heated to a semi-fluid mass as it is advanced through the chamber 2 by the rotating feed screw towards the outlet 5. The chamber 2 is heated by electric heating elements 6 which may be encased by heat insulating material 7, the temperature of the chamber 2 being automatically controlled to the correct temperature for plasticising the plastic material being used.

The outlet from the chamber 2 leads to an outlet head 8 which is also maintained at an elevated temperature by electric heating elements 9. Supported beneath the outlet head 8 is a housing 10 for a taper plug cock 11, to which the plastic material is fed through the passage 12. The passage 12 connects with a bore 13 which leads from the large diameter end of the plug cock 11 to two horizontal passages 14a, 14b at right angles to one another, which, by turning the cock 11, can be aligned with outlet openings at opposite sides of the housing 10 which lead respectively to conduits 15 extending horizontally from opposite sides of the housing 10. To the end of each conduit 15 is attached a nozzle head 16 formed with a downwardly extending extrusion nozzle 17. The extrusion nozzle is provided with an inner tubular member 18 which defines, with the inner surface of the nozzle 17, an annular passage so that the plastic material will be extruded from the nozzle in the form of a tube. Each of the inner tubular members 18 extends through the wall of its surrounding nozzle tube 16 and leads to an air control valve. Two such air control valves 19R and 19L are provided, one for each of the right and left extrusion nozzle heads. The conduits 15, the heads 16 and the nozzle 17 are heated by electric heating elements 20, and may be encased in insulating material 21. The temperature in the conduits 15, heads 16 and nozzles 17 is controlled, preferably automatically, so that the plastic material therein will remain plasticised or will be further softened by the applied heat.

Carried on the front of the machine and directly below the two nozzle heads 16 respectively, are two tables 22 which are vertically adjustable in slides 23 by means of screws 24 actuated by hand wheels 25. These tables 22 serve for supporting the moulds below the nozzles, the height of the tables being adjustable to suit moulds of different dimensions.

The feed screw 3 is driven by an electric motor 26 through a reduction gear 27 and a clutch 28, which latter may be actuated by the lever 29, pivoted to the machine frame at 30, and connected to the piston rod 31 of an air cylinder 32 which, when compressed air is supplied thereto, holds the clutch 28 engaged. The clutch 28 is normally urged to its disengaged position by the spring 33. The supply of compressed air to the cylinder 32 is controlled by two automatic control valves 85, 86 connected in series with a manual control valve 34, which is manually operated by the handle 35 at the front of the machine. The compressed air is supplied from the compressed air reservoir 36 which is fed from a compressor 37 driven by an electric motor 38.

The plug cock 11 is provided, at its lower end, with a shaft 40 carrying a crank arm 41 which is engaged and actuated by a forked member 42 on the piston rod 43 of a double-acting air cylinder 44. Operation of the piston in the cylinder 44 is controlled by an air control valve 82 which is operated by an automatic control apparatus as will be hereinafter described. The valve 82 selectively applies compressed air from the reservoir 36 to one end or the other of the cylinder 44 and simultaneously vents the other end thereof. Thus, the piston of the air cylinder 44 may be moved outwardly or inwardly to turn the shaft 40 and plug cock 11 through an angle of 90° so as to connect the extrusion chamber 2 with either one or other of the conduits 15.

The pressure of the plastic material applied at the upper end of the plug cock 11 keeps the latter in the taper seating in the housing 10 and reduces the possibility of leakage. In order to prevent the plug cock 11 from binding in its housing 10, a sleeve 47, surrounding the shaft 40 and threaded into the bottom flange 48 of the housing 10, may be screwed in until it bears on the bottom of the plug cock to lift the latter sufficiently to prevent it from binding in its taper seating. The sleeve 47 may be locked in the adjusted position by the lock nut 49.

The air valves 19R, 19L are actuated by a boss 46 on the piston rod 43 so that the valve 19R, 19L will be automatically operated in accordance with the movement of the plug cock 11 in such manner that air will be cut off from that nozzle 17 to which the cock 11 is turned for extrusion, and will be applied to the other nozzle. A main air control valve 19a is provided for shutting off air from both nozzles.

Air pressure for feeding to the inner tubular members 18 of the nozzles 17 through the valves 19 is also derived from the compressed air reservoir 36. The air pressure fed to the nozzles may be adjusted by a pressure-reducing device 50. A second pressure-reducing device 51 may be provided for adjusting the air pressure applied to the various air cylinders. 52 are start-stop switches for the electric motors 26 and 38.

In the front of the machine are also provided hose pipe connectors 53, associated with taps 54, by means of which rubber hoses (not shown) may be connected to and from the moulds 55 carried on the tables 22 for cooling the moulds in known manner.

The moulds 55 are conveniently constructed in two parts which are hinged together for opening and closing; or the mould parts may move relative to one another in rectilinear paths. The opening and closing of the left and right moulds is effected by two double-acting air cylinders 56L and 56R respectively, of which the piston rods 57L and 57R extend through the front of the machine housing 1 to connect with and operate the moulds on the tables 22. The supply of air to the cylinders 56L and 56R is controlled by two air valves 58L, 58R respectively, which are actuated by the movement of the boss 46 as will be hereinafter explained.

One constructional form of a mould is shown in Figures 3–5. The two mould parts 55 are carried respectively from side plates 59 which are mounted for hinging movement about vertical axis defined by pivot pins 60, 61 at their lower and upper edges and engaging respectively with bearing holes 62 in a base plate 63 and bearing holes 64 at the top of an end plate 65 secured to and extending upwardly from the base plate 63 between the side plates 59. The pivots are intermediate the front and rear ends of the plates 59, the rear ends of which are pivotally connected by toggle links 66, 67 to a member 68 secured to the end of a piston rod 57 of a mould-operating air cylinder 56. By withdrawing the piston rod 57, the toggle links 66, 67 cause the plates 59 to hinge about their pivots 60, 61 to the positions shown in dotted lines in Figure 4 in which the mould parts 55 are open. By the reverse movement of the piston rod 57, the plates 59 are turned in the reverse direction to close the mould.

The open end of the plastic tube is closed automatically upon closing the mould 55 by being gripped between the bottom walls 69 of the two mould parts.

The upper end of the cavity in the mould is provided with an annular cutting portion 70 which fits closely around the protruding end of the inner tubular member 18, when the mould is closed, whereby the closing of the mould will cut, either entirely or substantially entirely, the extruded portion of the plastic tubing from the mass of plastic material in the extrusion nozzle 17. Thus when the mould is opened, the formed hollow article may be easily ejected from the nozzle.

The ejection of the formed articles from the nozzles is effected at the left and right nozzles by forked members 71 carried by the piston rods of two air cylinders 72L and 72R having spring-restored pistons and carried respectively from the left and right nozzle heads. The restoring springs normally hold the pistons and forked members 71 with their forked ends extending around the nozzles 17 and above the moulds. When air is supplied to a cylinder 72, when the associated mould is open, the forked member 71 is moved downwards to eject the hollow article from the nozzle by which it is supported. The supply of air to the cylinders 72L and 72R is controlled by control valves 73L and 73R which are actuated by the movement of the boss 46 as will be hereinafter described.

The lengths of plastic tubing extruded from the left and right nozzles are controlled by photo-electric cells 78 and 79 respectively arranged behind the left and right moulds and associated with light sources 74, 75 respectively arranged in front of the moulds. The housings for the photo-cells and light sources are supported from a table 22 on supports 76, 77 on which the housings are vertically adjustable. The housings of the light sources are provided with lenses which face lenses in the associated photo-cell housings; the arrangement being such that each light beam will be focussed at a point which lies in the path of extrusion of a tube so that when the desired length of tube is extruded the light beam will be intercepted and the photo-cell will operate the control apparatus to stop extrusion.

The moulds are provided with apertures or open in such manner that, when the moulds are open, the light beams will not be interrupted by the mould parts or other mechanisms. In the particular mould construction described, the bottom of the mould parts 55 is spaced above the base plate 63, and the end plate 65 is provided with an opening 89 to allow the light beam to pass. The height of a photo-cell and associated light source are so adjusted that the bottom of the extruded tube will be pinched between the bottom edges 69 of the mould parts when the mould is closed.

The output from the photo-cell is fed to a timing device 81 forming part of the control apparatus as will be described with reference to Figure 6. There may be two timing devices 81L and 81R, one for each cell, or they may be combined in a single unit as described with reference to Figure 7. Manual switches, for example push button switches, may also be provided for manually actuating the control apparatus when setting up the machine.

The operation of the control apparatus will now be described with reference to the diagram of Figure 6.

As shown in the diagram, the piston rod 43 of the cylinder 44 which actuates the change-over valve 11 carries the boss 46 which, in its back and forth movement, actuates air control valves 19R, 19L, which control the supply of compressed air to the right and left nozzle heads respectively, air control valves 58R, 58L which control the operation of double-acting mould-operating air cylinders 56R, 56L respectively, and also air control valves 73L, 73R which respectively control single-acting ejector cylinders 72L and 72R having spring restored pistons. The air control valves 19, 58 and 73 are conveniently of the plunger-operated type in which the ends of the plungers carry rollers or the like arranged to be actuated by the boss 46 to change over the positions of the valves.

In the diagram, all the air control valves are indicated as blocks, the lines connecting the blocks representing pipes. The blocks are divided into sections marked "S," "C" and "X," S representing a port to which the air supply is connected, C an outlet port for compressed air when the valve is open, and X an exhaust port which connects with port C when the valve is closed. The circles marked "50," "51" respectively indicate connections to the pressure reducing valves 50, 51 in the supply of compressed air from the reservoir 36.

The cylinder 44 is controlled by an air control valve 82 which is controlled by two solenoid-operated pilot valves 83, 84, which are actuated by the associated solenoid coils 83a, 84a respectively. The coils 83a, 84a are energised by current supplied respectively from timing devices 81L, 81R which when operated, by impulses from the photo-cells 78, 79 respectively, will close the circuit through the corresponding coil 83a or 84a for a predetermined time. The timing devices 81 are adjustable to produce time periods of from about 1½ to 10 seconds to enable the control apparatus to be adjusted for making bottles of different sizes.

The clutch-operating cylinder 32 for actuating the clutch 28 in the drive to the feed screw 3 is effected through the two auto-control valves 85, 86 and a manual air valve 34 as hereinafter described.

The operation of the apparatus is as follows:

As above described, the two photo-cells 78, 79 and their associated light sources are disposed at such distances below the left and right extrusion nozzles 17 respectively that when the desired length of plastic tube has been extruded through a nozzle the corresponding light beam will be interrupted and the corresponding pilot valve 83 or 84 will be operated. Assuming that the change-over cock 11 is turned for extrusion from the left nozzle, when the desired length of tube has been extruded, it interrupts the light ray to the photo-cell 78 and the coil 83a is energised for a period of time which may vary from 1½ to 10 seconds depending upon the setting of the timing device 81L.

When coil 83a is energized, pilot valve 83 operates and provides air to the control valve 85 which cuts off air to the clutch cylinder 32 thereby disengaging the clutch 28 and stopping extrusion. At the same time valve 83 also provides air to the control valve 82 which operates and supplies air to the rear end of cylinder 44. The piston rod 43 commences to move to the right. Valve 83 also prepares the air circuit for supplying air to the right ejection cylinder 72R via valve 73R. As the ram 43 moves towards the right, the boss 46 operates the various valves associated therewith as follows:

(a) Valve 19R closes to cut off the air supply to the right extrusion nozzle 17.

(b) Valve 73L closes to prevent the left ejecting cylinder 72L from operating until it is again opened.

(c) Valve 58L operates and operates the cylinder 56L which closes the left mould 55 around the length of tube extruded from the left nozzle.

(d) Valve 58R operates and cylinder 56R changes position from RCL (right close) to RO (right open) and the right mould is opened.

(e) Valve 19L opens to supply air to the left nozzle, so blowing the hollow article in the left mould.

(f) Valve 73R operates to supply air to the right ejection cylinder 72R from the circuit previously prepared from valve 83, and the hollow article suspended on the right nozzle is ejected.

The cock 11 is rotated by movement of the piston rod 43 and is turned to the position ready to supply plastic material through the right nozzle 17.

When the coil 83a de-energizes (that is within 1½ to 10 seconds after being energised) valve 83 restores and in so doing allows the right ejection cylinder 72R to restore under the action of its restoring spring. The restoring of valve 83 also removes air from the control of valve 85 so restoring 85 and the air supply to the clutch cylinder 32 via the valves 86 and 34 whereby the clutch again engages and extrusion commences from the right nozzle 17.

Extrusion continues at the right nozzle until the tube extruded thereat interrupts the light ray falling on the photo-cell 79, thereby causing coil 84a to be energised and operating pilot valve 84 which, by providing air to the valve 86, cuts off the air to the clutch cylinder 32 thereby disengaging the clutch and preventing further extrusion. Pilot valve 84 also provides air to the valve 82 which operates and supplies air to the front of cylinder 44 whereby the piston rod 43 commences to move towards the left. Pilot valve 84 also prepares the circuit for the supply of air to the left ejection cylinder 72L via the valve 73L.

The piston rod 43 then moves towards the left and the boss 46 carried thereby operates the associated valves as follows:

(g) Valve 19L closes and cuts off the air supply to the left extrusion nozzle 17.

(h) Valve 73R drops out so that air will not be fed to the right ejection cylinder 72R when pilot valve 83 again operates.

(i) Valve 78R operates to operate cylinder 56R to close the right mould.

(j) Valve 58L drops out and supplies air to cylinder 56L to open the left mould.

(k) Valve 19R opens and supplies air to the right mould so blowing the hollow article.

(l) Valve 73L operates and provides air to the left ejection cylinder 72L to eject the hollow article suspended from the left nozzle.

The movement of the piston rod 43 to its left position turns the cock 11 to prepare the machine for extrusion from the left nozzle.

When coil 84 is de-energized (within 1½ to 10 seconds after being energised depending upon the setting of the timing device 81R) the valve 84 restores and in so doing allows the left ejection cylinder 72L to restore. The restoring of the valve 84 removes air from the control of valve 86 so opening this valve and the air circuit to the clutch cylinder 32 so that extrusion again commences at the left nozzle.

The cycle of operation then repeats. The machine will operate entirely automatically so long as raw plastic material is fed to the machine hopper.

Flow regulators may be fitted to the various cylinders to control their speed of operation. For example, a flow regulator 87 can be connected in the exhaust of the valve 82 to control the speed of the piston rod 43. Similar flow regulators can be fitted in the exhaust of valves 58L and 58R to control the mould opening and closing speeds.

Figure 6:
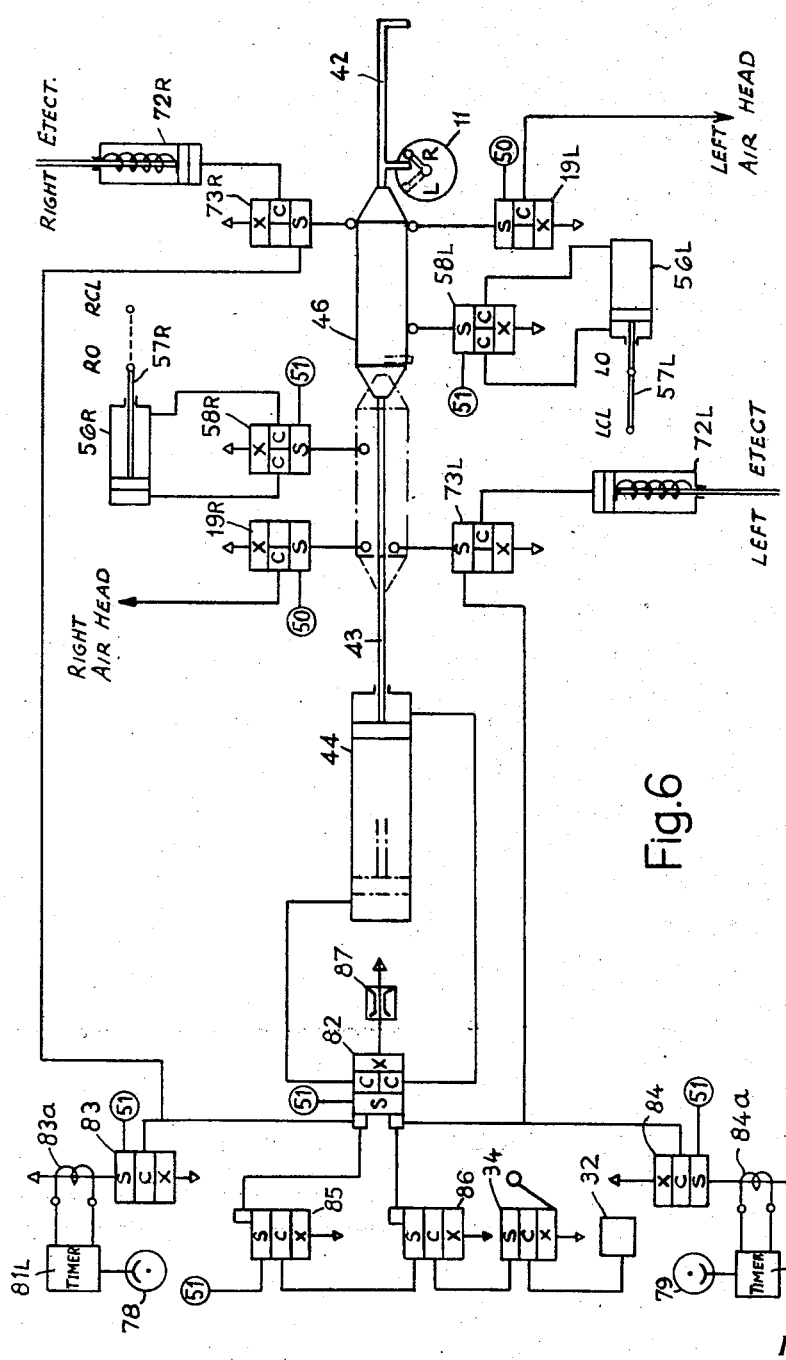
Figure 6 is a diagram explaining the operation of the control apparatus incorporated in the machine.

Figure 7 shows a circuit diagram of a timing device 81, in which both units 81L and 81R of Figure 6 are incorporated in a single equipment to the input of which the photo-cells 78—79 are selectively switched, depending upon which photo-cell is in use, and of which the output is selectively switched to the solenoid 83a of 84a.

In this figure the conventional system of showing the relays and their associated contacts has been adopted in which the relays are represented by letters followed by a stroke and then by the number of contacts associated with that relay, the contacts then being indicated by the same letter followed by the appropriate number of the contact. Thus, for example, relay A/3 indicates that it has three contacts which are indicated by the references A1, A2, A3 respectively. Similarly the relay B/1 has only one contact which is represented by B1.

The photo-cells 78, 79 are connected through plug and socket connections 101, 102 and the contact G1 to the receiver PE (comprising an amplifier and relay) for the photo-cell currents. The receiver PE is fed from the mains supply 104, 105 via a manual control switch 103.

SW is a limit switch which is connected across the mains supply 104, 105 in series with the relay L/2. Limit switch SW operates in accordance with the movement of the change-over cock 11, the switch contacts being open when the change-over cock 11 is arranged to feed plastic material to the left nozzle head in which position the photo-cell 78 is operative and connected to the receiver PE through the contact G1. When the change-over cock 11 moves to its position for extrusion from the right nozzle head, the limit switch SW closes thereby energising relay L/2 which at its contact L2 energises relay G/1 through the rectifier arrangement 106 from the secondary winding 108 of the mains transformer 107 of which the primary winding 109 is shunted across the mains supply 104, 105. When relay G/1 operates, it switches its contact G1 to connect the photo-cell 79 to receiver PE.

Assume that the limit switch SW is in the open position shown and that photo-cell 78 is thus operative. Relay L/2 is in its normal position, contact L2 being open and contact L1 being in the position shown and preparing relay C/3. When the unit is switched on, the condenser 112 shunting relay B/1 will be charged through the secondary winding 110 of the mains transformer 107 rectifier arrangement 111, and the variable resistor 113. Relay B/1 will thus be operated and at its contact B1 will prepare the circuit for relay A/3.

When extrusion of the plastic tube from the left nozzle interrupts the light beam to the photo-cell 78, the receiver PE operates its contact PE which moves from the resting position shown to complete the circuit for relay A/3 via contact B1. The relay A/3 closes and locks itself via its contact A2, and contact A1 changes over and completes the discharge circuit for the condenser 112 shunting relay B/1 through the variable resistors 114 and 115. Contact A3 closes and completes the circuit for the relay C/3 via contact L1 and contact D2. Relay C/3 operates and locks itself via contacts A3, C1 and D2. Contact C2 opens thus preventing the operation of relay D/3. Contact C3 closes to operate solenoid 83a associated with the control valve 83 which applies air to the lefthand end of cylinder 44 to move the piston rod 43 to change over the cock 11.

When the cock 11 is changed over, the limit switch SW operates and closes, thereby energising relay L/2 which at its contact L2 energises the relay G/1 which switches its contact G1 to disconnect photo-cell 78 from and connect photo-cell 79 to receiver PE. At its contact L1 a circuit is prepared for the relay D/3 but relay D/3 cannot operate because contact C2 is still open.

After a predetermined time period, for example between approximately 1½ to ten seconds, which is preset by the variable resistors 114, 115 condenser 112 will be discharged and relay B/1 will de-energise and restore its contact B1 which allows relay A/3 to fall off which opens its locking circuit at A2. Contact A1 in restoring, re-connects condenser 112 and relay B/1 to the rectifier 111 so that condenser 112 re-charges and B/1 energises ready for the next operation. The circuit for relay C/3 is opened at A3. C1 opens the locking circuit for relay C/3, C2 closes to prepare relay D/3 and C3 opens to de-energise solenoid 83a to restore valve 83.

When the light beam associated with photo-cell 79 is interrupted by a length of tube extruded through the right nozzle head, the control apparatus operates in a manner similar to that above described except that, as limit switch SW is now closed, relay D/3 operates instead of relay G/3 and consequently the solenoid 84a operates instead of solenoid 83a. Operation of solenoid 84a causes the piston rod 43 to move in the opposite direction to change over the cock 11 to the left position. The cycle then repeats.

The projector lamps 74, 75 associated respectively with the photo-cells 78, 79 are each fed from a tapping on the secondary winding 108 of the mains transformer 107 through lamp failure guard circuits respectively including relays E/1 and F/1 connected in series with their respective projector lamps 74 and 75 and the variable resistors 118, 119 for controlling the lamp intensities. Contacts E1 and F1 of these relays are connected in series in a motor trip circuit connected across the terminals 120, 121 so that lamp failure will operate the motor trip circuit to stop the motor 26 driving the extrusion feed screw of the machine.

The control apparatus also includes a counter 122 which operates at each closing of the contact A3.

With the circuit shown in Figure 7, the time delay is the same in each half-cycle. If different time delays are required for each half-cycle, then either two separate timing devices 81L and 81R are used, as shown in Figure 6 or the circuit of Figure 7 can be modified by incorporating two discharge circuits for relay B/1 which are selectively connected across the relay depending upon the position of the limit switch.

As mentioned above, manual switches may also be provided for use in actuating the control apparatus whilst setting-up the machine.

It will be understood that the machine which has been described may be modified in various ways without departing from the invention. Thus if automatic mould opening and closing is not required, the valves 58 and cylinders 56 may be omitted. Similarly, if automatic ejection is not required, the valves 73 and cylinders 72 may be omitted. The various control valves and air cylinders may be adapted for operation by any other fluid, for example hydraulically, or may be replaced by electric switches and electrically operated devices.

The control apparatus described can be modified for use with machines having more than two nozzle heads, for example machines as described in my United States Patent No. 2,724,860, dated November 29, 1955.

In applying the invention to a single nozzle head machine, the timing device can be constructed in a manner similar to that shown in Figure 7 except that, as only one photo-cell is required, the relay G/1 and the limit switch SW can be dispensed with, as also can the relays D/3 and F/1 and the rectifier 106. If the single nozzle head machine operates with plural moulds which are successively moved into position beneath the nozzle head, for example by a rotary table as described in British Patent No. 564,350, the machine may be adapted for making different sized bottles in successive moulds by simply adjusting the photo-cell and projector lamp to operate when the appropriate length of plastic tube has been extruded for the particular mould being used. For example, the height of the photo-cell may be automatically adjusted at each extrusion in accordance with a preset control sequence corresponding to the sequence in which the moulds are moved to the extrusion position. Or the moulds may each be provided or associated with control cams or equivalent means, corresponding respectively to the individual moulds, for automatically adjusting the height of the photo-cell in accordance with the particular mould in the extrusion position.

If the photo-cell is operated by light reflected from the extruded plastic tube, instead of by the tube interrupting a light beam which normally falls on the photo-cell, the adjustment of the photo-cell and projector lamp for different lengths of tube may be effected by inclining the photo-cell and projector lamp upwardly or downwardly instead of by vertically raising and lowering the photo-cell and lamp.

Whilst particular embodiments have been described it will be understood that various modifications may be made without departing from the scope of the invention. Thus the photo-cell can be responsive either to visible or invisible light or may be replaced by an equivalent detector device which is responsive to a ray or beam which is intercepted by the extruded tube of plastic.

I claim:

1. A machine for the manufacture of hollow articles of organic plastic material by the process of blowing an extruded tube of the material within a mould, said machine comprising two nozzle heads each comprising at least one downwardly directed annular nozzle, change-over means for selectively extruding plastic material through said nozzle heads, means for projecting a light beam across the spaced below one nozzle head so as to be intercepted by the plastic tube extruded therethrough, a photocell arranged to operate when the light beam is intercepted by the extruded tube, control apparatus actuated by the operation of the photo-cell to stop extrusion and to actuate the change-over means for extrusion from the second nozzle head, said control apparatus including time delay means for re-starting extrusion from said second nozzle head after a time period determined by the control apparatus, further means for projecting a light beam across the space below the second nozzle head so as to be intercepted by the plastic tube extruded from said second nozzle head, a second photo-cell arranged to operate when the light beam is intercepted by the tube extruded through said second nozzle head, the operation of said second photo-cell actuating the control apparatus to stop extrusion through said second nozzle head and to actuate the change-over means for extrusion from said first nozzle head, extrusion through the first nozzle head re-starting after a time delay determined by the control apparatus.

2. A machine for the manufacture of hollow articles of organic plastic material by the process of blowing an extruded tube of the material within a mould, said machine comprising means for extruding a tube of plastic material through a downwardly directed annular nozzle, start-stop means for starting and stopping extrusion, measuring means positioned below said nozzle and operable upon the bottom of the extruded tube reaching a level determined by the position of the measuring means, means actuated by the operation of said measuring means to operate said start-stop means to stop extrusion, time delay means defining a time period, means for initiating the operation of the time delay means by the operation of the measuring means, and means actuated by the time delay means upon the termination of said time period to operate said start-stop means to restart extrusion.

3. A machine for the manufacture of hollow articles of organic plastic material by the process of blowing an extruded tube of the material within a mould, said machine comprising a chamber containing a rotatable feed screw, a motor for driving said feed screw, a clutch in the drive between said motor and said feed screw, means for feeding comminuted solid organic plastic material to said chamber, said feed screw advancing the material fed thereto towards an outlet opening, means for heating said chamber so that the material is plasticised to a semi-fluid mass before it reaches said outlet opening, a passage connecting said opening to a nozzle head comprising at least one downwardly directed nozzle comprising inner and outer tubular members defining between them an annular passage through which the semi-fluid mass fed thereto will be extruded in tubular form, means for feeding a compressed fluid through the inner member of said at least one nozzle, means for projecting a light beam across the space below said nozzle head so as to be intercepted by a plastic tube extruded therethrough, a photo cell arranged to operate when said light beam is intercepted by the extruded tube, means actuated by the operation of said photo cell to disengage said clutch to stop extrusion, and time delay means the operation of which is initiated by the operation of said photo cell, and means operated upon the termination of the time period determined by said time delay means for re-energaging the clutch.

4. A machine as claimed in claim 3, comprising also an electrically-operated fluid control valve for controlling of said clutch, and electric circuit means for operating said electrically-operated fluid control valve upon operation of said photo cell to disengage the clutch, said electric circuit means incorporating time delay means for maintaining said electrically-operated fluid control valve operated for a time period after the operation of the photo cell.

5. A machine as claimed in claim 4, wherein the electric circuit means comprises a photo cell amplifier to the input of which the photo cell is connected, a time delay circuit including a capacity shunted across a relay and an associated discharge circuit for discharging said capacity over a time period, switching means normally opening said discharge circuit and connecting said capacity in a charging circuit across a source of potential, means responsive to the output from said photo cell amplifier to actuate said switching means to open the charging circuit and close the discharge circuit and to energise said electrically-operated fluid control valve, said relay having a contact which opens to de-energise the electrically-operated fluid control valve and to restore the switching means to its charging position at the end of the discharge time period of the capacity.

6. A machine for the manufacture of hollow articles of organic plastic material by the process of blowing an extruded tube of the material within a mould, said machine comprising a chamber containing a rotatable feed screw, a motor for driving said feed screw, a clutch in the drive between said motor and said feed screw, means for feeding comminuted solid organic plastic material to said chamber, said feed screw advancing the material fed thereto towards an outlet opening, means for heating said chamber so that the material is plasticized to a semi-fluid mass before it reaches said outlet opening, two conduits leading from said opening to two nozzle heads respectively, each nozzle head comprising at least one downwardly directed nozzle comprising inner and outer tubular members defining between them an annular passage through which the semi-fluid mass fed thereto will be extruded in tubular form, heating means associated with said conduits for maintaining any plastic material therein in the semifluid state, change-over means for alternatively connecting the supply of plastic material to one of said nozzle heads and cutting off the supply of plastic material to said other nozzle head, means for feeding a blowing fluid through the inner member of each nozzle, means for selectively controlling the supply of blowing fluid to the at least one nozzle associated with the individual nozzle heads, means for projecting a first light beam across the space below one nozzle head so as to be intercepted by the plastic tube extruded therethrough, a first photo cell arranged to operate when said first light beam is intercepted by the corresponding extruded tube, means for projecting a second light beam across the space below the other nozzle so as to be intercepted by the plastic tube extruded therethrough, a second photo cell arranged to operate when said second light beam is intercepted by the corresponding extruded tube, control apparatus including means actuated by the operation of a photo cell to disengage said clutch to stop extrusion and to actuate the change-over means to connect the supply of plastic material to the nozzle head associated with the other photo cell, said control apparatus also including time delay means the operation of which is initiated by the operation of a photo cell, and means operated upon the termination of the time period determined by said time delay means for re-engaging the clutch.

7. A machine as claimed in claim 6, wherein the changeover means comprises a rotary distributor valve and fluid-operated piston means for moving said distributor valve back and forth between two alternative positions for alternative extrusion through the two nozzle heads, said machine also comprising a first electrically-operated fluid control valve connected for controlling the supply of fluid to move said piston means in one direction, a second electrically-operated fluid control valve connected for controlling the supply of fluid to move said piston means in the opposite direction, electric circuit connections for operating said first electrically-operated control valve upon operation of said first photo cell, electric circuit connections for operating said second electrically-operated fluid control valve upon operation of said second photo cell, said electric circuit connections incorporating time delay means for maintaining said electrically-operated fluid control valves operated for a time period after the operation of the associated photo cell.

8. A machine as claimed in claim 7, comprising also a mould associated with each nozzle head, fluid cylinders for opening and closing each mould, a plurality of fluid-control valves controlling respectively the fluid cylinders for opening and closing the moulds and the supply of blowing fluid to the individual nozzle heads, valve actuating means movable with the movement of the piston means and adapted to actuate said fluid-control valves in sequence to cut off blowing fluid to the one nozzle head opposite to that at which extrusion has last taken place and to open the mould thereat and to close the mould associated with the other nozzle head and to supply blowing fluid to said other nozzle head.

9. A machine as claimed in claim 8, comprising also fluid-operated ejectors at each nozzle head for ejecting a hollow article formed thereat, each ejector being moved to an ejecting position by applied fluid pressure and being restored to its normal position by a spring, further fluid-control valves for controlling the supply of fluid to operate said ejectors, said further fluid-control valves being actuated by said valve actuating means in sequence with the other fluid-control valve, to actuate an ejector after the associated mould has been opened, and means for interrupting the supply of fluid pressure to an ejector when the electrically-operated fluid control valve associated with the other nozzle head is inoperative.

10. A machine as claimed in claim 7, wherein the electric circuit means comprises a photo cell amplifier, a change-over switch for selectively connecting the two photo cells to the input of the amplifier, a limit switch operated by the position of the rotary distributor valve and controlling the position of the change-over switch whereby to connect to the amplifier that photo cell which is associated with the nozzle head which is connected for extrusion, a time delay circuit including a capacity shunted across a relay and an associated discharge circuit for discharging said capacity over a time period, switching means normally opening said discharge circuit and connecting said capacity in a charging circuit across a source of potential, and means responsive to the output from said photo cell amplifier to actuate said switching means to open the charging circuit and close the discharge circuit and selectively operate one of said electrically-operated fluid control valves in accordance with the position of the limit switch, said relay having a contact which opens to release the operated electrically-operated fluid control valve and to restore the switching means to its charging position at the end of the discharge time period of the capacity.

11. A machine as claimed in claim 6, comprising two electric lamps for producing said first and second light beams respectively, relay means connected in series with said lamps, and switch means responsive to operation of said relay means upon lamp failure for stopping the driving motor.

References Cited in the file of this patent

UNITED STATES PATENTS

| 1,944,464 | Richardson | Jan. 23, 1934 |
| 2,010,777 | Grotta | Aug. 6, 1935 |
| 2,632,202 | Haines | Mar. 24, 1953 |

FOREIGN PATENTS

| 156,324 | Australia | May 4, 1954 |

(Corresponding U. S. Patent 2,724,860, Nov. 29, 1955)

| 163,661 | Australia | June 28, 1955 |